US011889865B2

(12) United States Patent
Liu

(10) Patent No.: US 11,889,865 B2
(45) **Date of Patent: *Feb. 6, 2024**

(54) GLASS ATOMIZER HAVING INNER GLASS TUBE INTEGRATED WITH OUTER GLASS TUBE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 360 days.

This patent is subject to a terminal disclaimer.

(21) Appl. No.: 17/239,718

(22) Filed: Apr. 26, 2021

(65) Prior Publication Data

US 2022/0079235 A1 Mar. 17, 2022

(30) Foreign Application Priority Data

Sep. 17, 2020 (CN) ......................... 202022043762.3

(51) Int. Cl.

| | |
|---|---|
| ***A24F 40/46*** | (2020.01) |
| ***A24F 40/48*** | (2020.01) |
| ***A24F 40/10*** | (2020.01) |
| ***A24F 40/42*** | (2020.01) |
| ***A24F 7/00*** | (2006.01) |
| ***H05B 3/46*** | (2006.01) |

(52) U.S. Cl.
CPC ................ *A24F 40/46* (2020.01); *A24F 7/00* (2013.01); *A24F 40/10* (2020.01); *A24F 40/42* (2020.01); *A24F 40/48* (2020.01); *H05B 3/46* (2013.01)

(58) Field of Classification Search
CPC .......... A24F 40/46; A24F 40/48; A24F 40/10; H05B 3/46
See application file for complete search history.

(56) References Cited

U.S. PATENT DOCUMENTS

| | | | | |
|---|---|---|---|---|
| 9,072,322 | B2 * | 7/2015 | Liu | A24F 40/485 |
| 2022/0061384 | A1 * | 3/2022 | Liu | A24F 40/42 |
| 2022/0079240 | A1 * | 3/2022 | Liu | A24F 40/10 |
| 2022/0132928 | A1 * | 5/2022 | Liu | A24F 40/46 131/329 |
| 2022/0175037 | A1 * | 6/2022 | Liu | A24F 40/40 |
| 2022/0192265 | A1 * | 6/2022 | Liu | H05B 3/42 |
| 2022/0378097 | A1 * | 12/2022 | Liu | A24F 40/40 |

* cited by examiner

*Primary Examiner* — Hae Moon Hyeon
(74) *Attorney, Agent, or Firm* — MATTHIAS SCHOLL P.C.; Matthias Scholl

(57) ABSTRACT

A glass atomizer includes a member for e-liquid injection and vapor discharge. The member for e-liquid injection and vapor discharge includes an outer glass tube and an inner glass tube disposed in the outer glass tube. The inner glass tube includes a top end. The outer edge of the top end includes a plurality of grooves. The top end is integrated with the inner wall of the outer glass tube.

12 Claims, 5 Drawing Sheets

GLASS ATOMIZER HAVING INNER GLASS TUBE INTEGRATED WITH OUTER GLASS TUBE

CROSS-REFERENCE TO RELATED APPLICATIONS

Pursuant to 35 U.S.C. § 119 and the Paris Convention Treaty, this application claims foreign priority to Chinese Patent Application No. 202022043762.3 filed on Sep. 17, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a glass atomizer.

Conventionally, the atomizers include a cylindrical ceramic core and a spiral heating wire disposed in the cylindrical ceramic core. The spiral heating wire has a low heating power, and thus only a small amount of vapor is produced.

SUMMARY

The disclosure provides a glass atomizer, comprising a member for e-liquid injection and vapor discharge, wherein the member for e-liquid injection and vapor discharge comprises an outer glass tube and an inner glass tube disposed in the outer glass tube; the inner glass tube comprises a top end; an outer edge of the top end comprises a plurality of grooves; and the top end is integrated with an inner wall of the outer glass tube.

In a class of this embodiment, the member for e-liquid injection and vapor discharge further comprises a seal gasket and a ceramic heating core; the seal gasket comprises a hollow center and is disposed around the ceramic heating core; one end of the ceramic heating core is embedded in a bottom opening of the inner glass tube; a bottom end of the inner glass tube abuts against the seal gasket or the seal gasket is disposed around the bottom end of the inner glass tube.

In a class of this embodiment, the ceramic heating core is in the shape of a concave bowl, and comprises a protruding edge, a bottom, and a heating wire disposed on the bottom.

In a class of this embodiment, the member for e-liquid injection and vapor discharge further comprises a fixed ring and a base; the fixed ring is disposed around the base; and a bottom end of the outer glass tube is disposed around the fixed ring.

In a class of this embodiment, the base comprises an air hole.

In a class of this embodiment, the member for e-liquid injection and vapor discharge further comprises a silicone fixing part; the ceramic heating core is disposed on the silicone fixing part; and the silicone fixing part is disposed in the base.

In a class of this embodiment, the silicone fixing part comprises a recess.

In a class of this embodiment, the member for e-liquid injection and vapor discharge further comprises a seal plug disposed on a top of the inner glass tube and configured to seal a top opening of the inner glass tube after the inner glass tube is filled with e-liquid.

In a class of this embodiment, the member for e-liquid injection and vapor discharge further comprises a joint and an insulation ring; the insulation ring is disposed in a bottom of the base to separate a positive lead from a negative lead of the ceramic heating core and meanwhile fix the negative lead; and the joint is disposed in the insulation ring to fix the positive lead of the ceramic heating core.

In a class of this embodiment, the member for e-liquid injection and vapor discharge further comprises a mouthpiece and a seal ring; the seal ring is disposed around the mouthpiece to seal a gap between the mouthpiece and the outer glass tube thus preventing the leakage of air and vapor; and the mouthpiece is disposed on a top of the outer glass tube.

In a class of this embodiment, the air enters the atomizer via a space between the fixed ring and the base, flows through the air hole on the base and the recess on the silicone fixing part, drives the vapor produced by the ceramic heating core to pass through the space between the inner glass tube and the outer glass tube, and is discharged from the plurality of grooves of the top end of the inner glass tube for user's inhaling via the mouthpiece.

In a class of this embodiment, the outer glass tube and the inner glass tube comprise toughened glass, high temperature resistant poly-cyclohexylenedimethylene terephthalate glycol (PCTG), high temperature resistant resin, high temperature resistant acrylic, an explosion-proof film, or a combination thereof.

The disclosure also provides an electronic cigarette comprising an atomization assembly and a battery assembly; the atomization assembly comprises a glass atomizer.

DETAILED DESCRIPTION

To further illustrate, embodiments detailing a glass atomizer are described below. It should be noted that the following embodiments are intended to describe and not to limit the disclosure.

Figure 1:
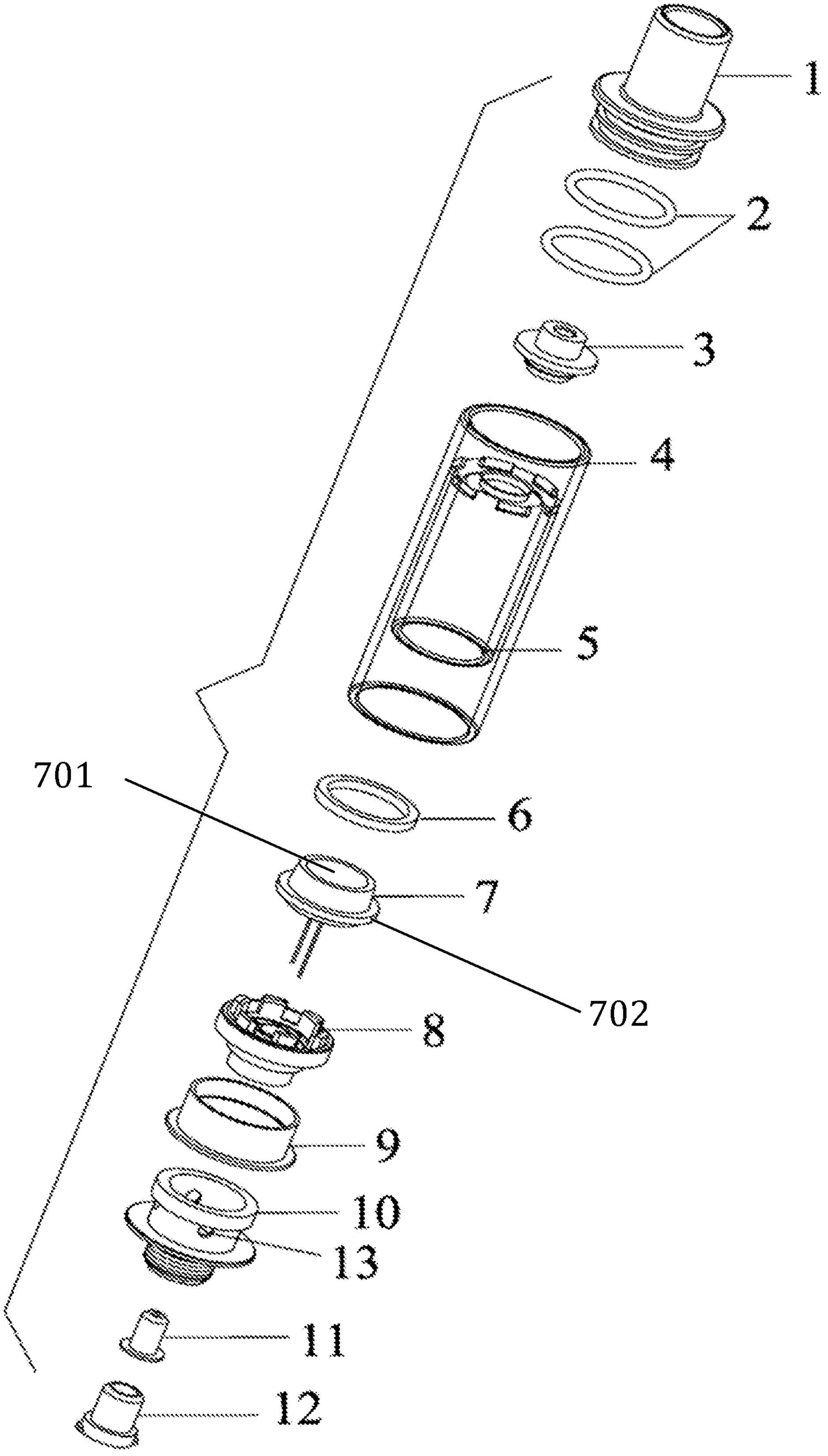
FIG. 1 is an exploded view of a glass atomizer in accordance with one embodiment of the disclosure.
Figure 2:
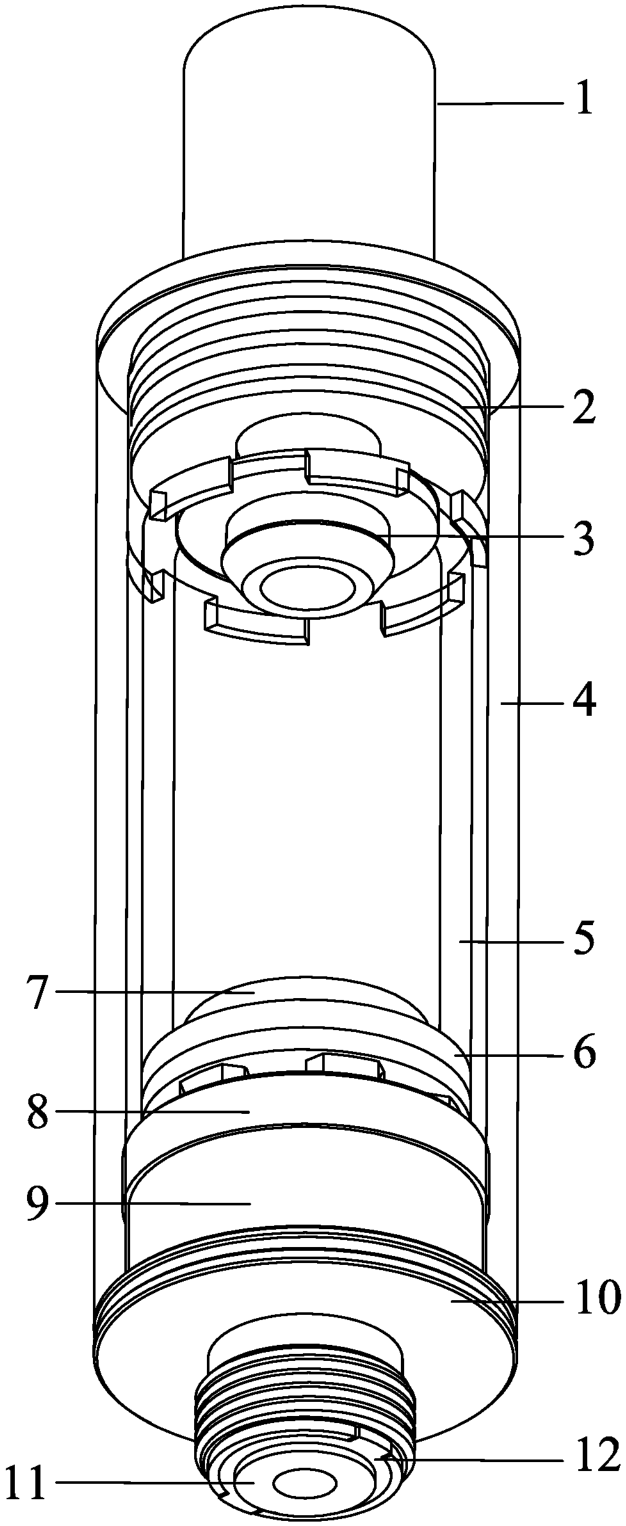
FIG. 2 is a schematic diagram of a glass atomizer in accordance with one embodiment of the disclosure.
Figure 3:
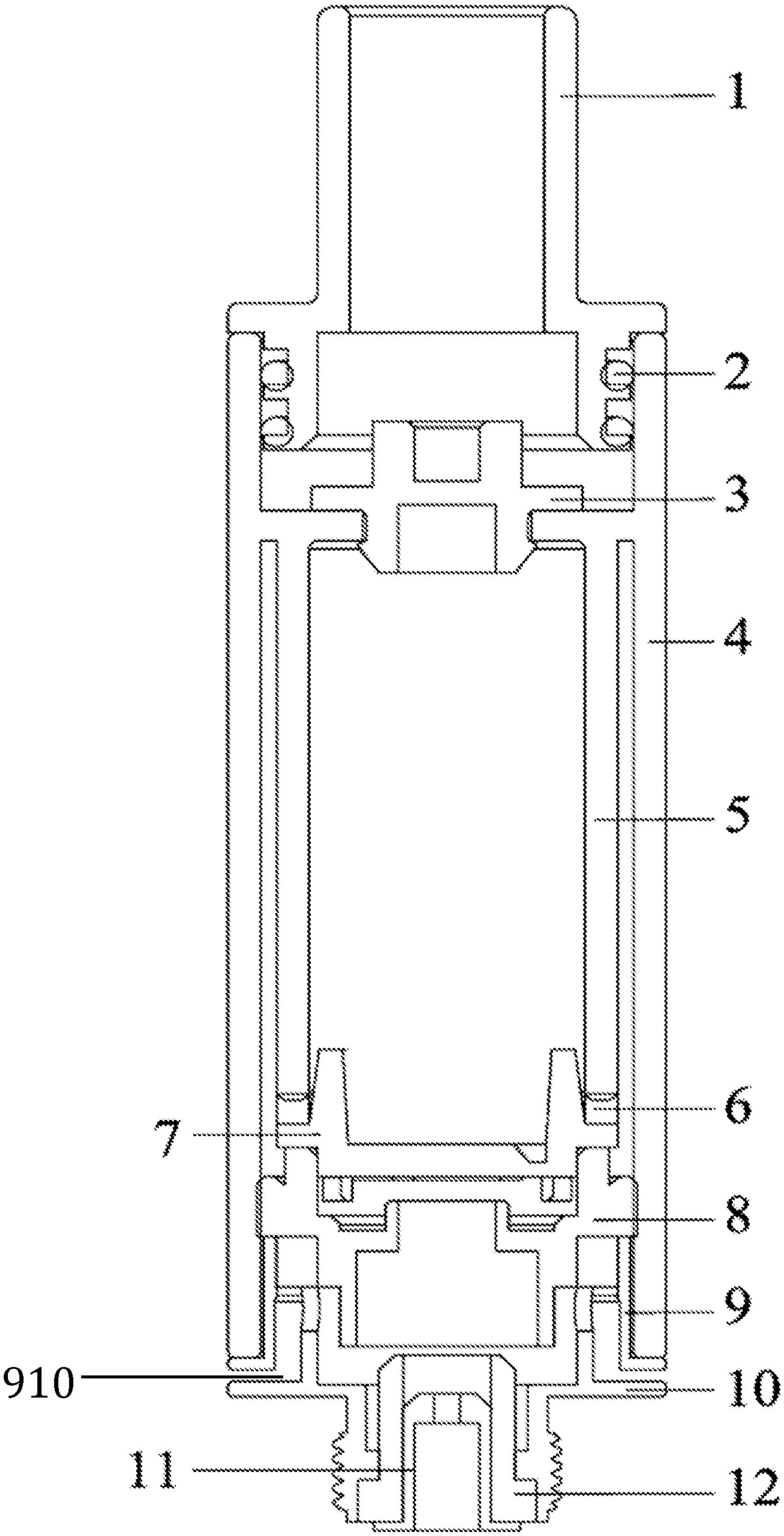
FIG. 3 is a sectional view of a glass atomizer in accordance with one embodiment of the disclosure.
Figure 4:
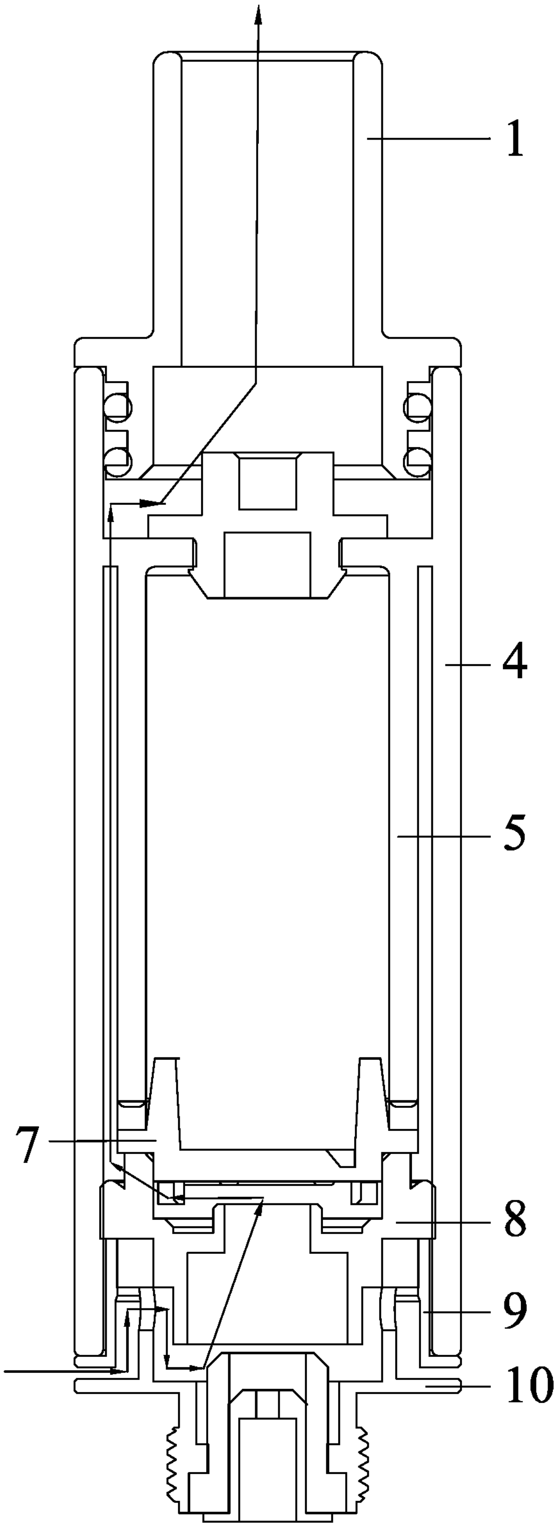
FIG. 4 shows a moving direction of air in a glass atomizer in accordance with one embodiment of the disclosure.
Figure 5:
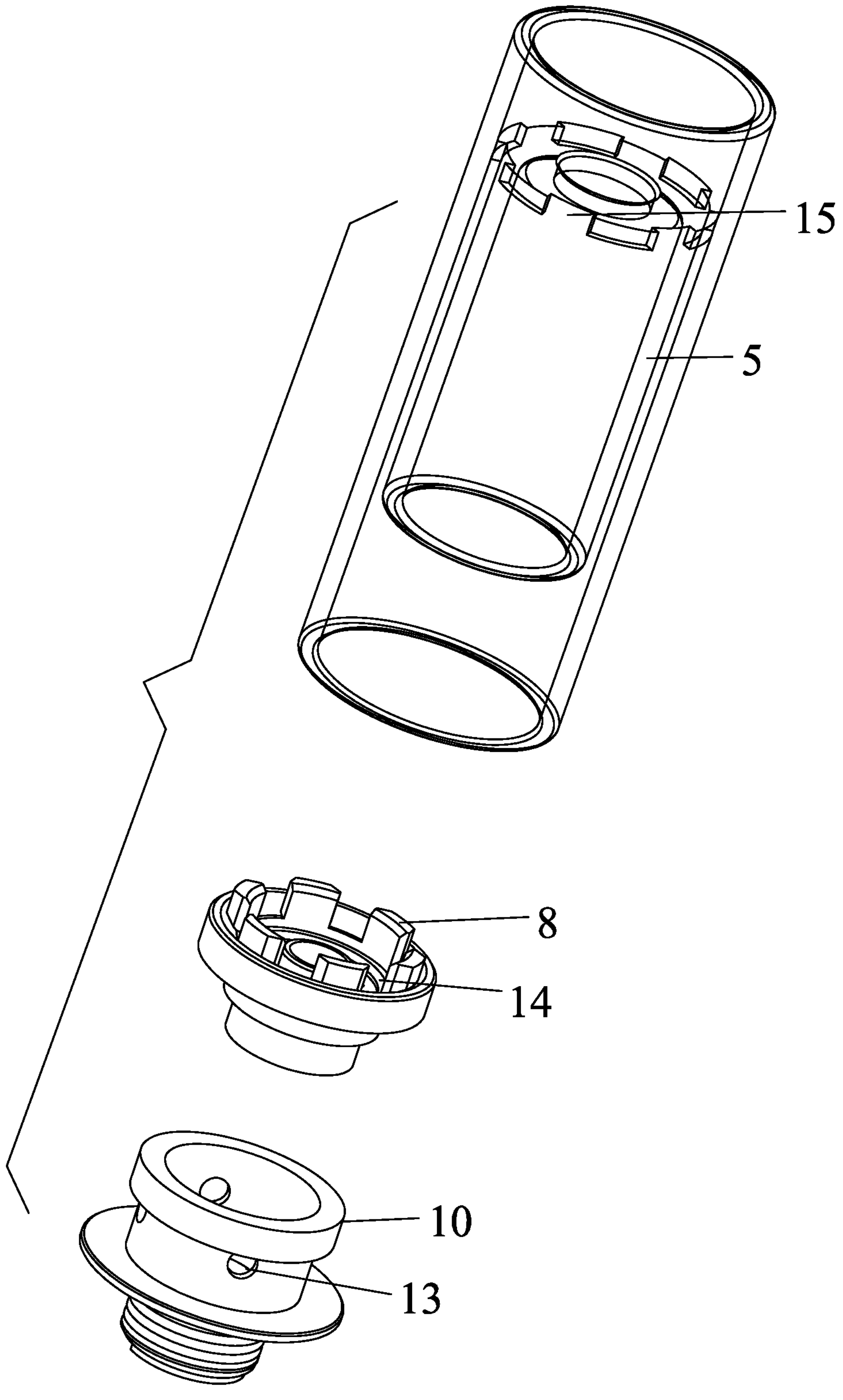
FIG. 5 is an exploded view of an air passage of a glass atomizer in accordance with one embodiment of the disclosure.

As shown in FIGS. 1-5, the disclosure provides a glass atomizer comprising a mouthpiece 1, a seal ring 2, a seal plug 3, an outer glass tube 4, an inner glass tube 5, a seal gasket 6, a ceramic heating core 7, a silicone fixing part 8, a fixed ring 9, a base 10, a joint 11, and an insulation ring 12. The silicone fixing part 8 comprises a recess 14. The base 10 comprises an air hole 13. The inner glass tube 5 is disposed in the outer glass tube 4. The inner glass tube 5 comprises a top end. The outer edge of the top end comprises a plurality of grooves 15. The top end is integrated with the inner wall of the outer glass tube 4. The seal gasket 6 comprises a hollow center and is disposed around the ceramic heating core 7. One end of the ceramic heating core 7 is embedded in the bottom opening of the inner glass tube 5. The bottom end of the inner glass tube 5 abuts against the seal gasket 6 or the seal gasket 6 is disposed around the bottom end of the inner glass tube 5. The fixed ring 9 is disposed around the base 10. The bottom end of the outer glass tube 4 is disposed around the fixed ring 9. The ceramic heating core 7 is disposed on the silicone fixing part 8. The silicone fixing part 8 is disposed in the base 10. The insulation ring 12 is disposed in the bottom of the base 10 to separate the positive lead from the negative lead of the ceramic heating core 7 and meanwhile fix the negative lead. The joint 11 is disposed in the insulation ring 12 to fix the positive lead of the ceramic heating core 7. The seal plug 3 is disposed on the top of the inner glass tube 5 and is configured to seal a top opening of the inner glass tube 5 after the inner glass tube 5 is filled with e-liquid. The seal ring 2 is disposed around the mouthpiece 1 to seal the gap between the mouthpiece 1 and the outer glass tube 4 thus preventing the leakage of the air and the vapor. The mouthpiece 1 is disposed on the top of the outer glass tube 4.

When injected into the inner glass tube 5, the e-liquid penetrates into the surface of the ceramic heating core 7, and no drops are formed on the surface of the ceramic heating core 7 and no drops leak into between the inner glass tube 5 and the outer glass tube 4. The air enters the atomizer via the space 910 between the fixed ring 9 and the base 10, flows through the air hole 13 on the base 10 and the recess 14 on the silicone fixing part 8, drives the vapor produced by the ceramic heating core 7 to pass through the space between the inner glass tube 5 and the outer glass tube 4, and is discharged from the plurality of grooves 15 of the top end of the inner glass tube 5 for user's inhaling via the mouthpiece 1.

In the disclosure, the grooves 15 and the recess 14 are configured for air ventilation and can present in different forms. For example, the grooves are disposed on the inner edge of the top end of the inner glass tube 5, or the grooves are replaced by through holes, etc. The grooves 15 of the inner glass tube 5 are not necessarily on the top end of the inner glass tube 5, but may be on the middle part of the inner glass tube. The top of the inner glass tube 5 and the top of the outer glass tube 4 may be flush, and the mouthpiece 1 is disposed on the top of the outer glass tube 4. The material of the outer glass tube 4 and the inner glass tube 5 can also be replaced by the same material selected from toughened glass, high temperature resistant poly-cyclohexylenedimethylene terephthalate glycol (PCTG), high temperature resistant resin, high temperature resistant acrylic, an explosion-proof film, or a combination thereof.

The following advantages are associated with the glass atomizer of the disclosure:

1. The glass atomizer comprises an outer glass tube and an inner glass tube, and the vapor produced by the ceramic heating core passes through the space between the inner glass tube 5 and the outer glass tube 4. This simplifies the member for vapor discharge of the atomizer.

2. The ceramic heating core 7 is in the shape of a concave bowl 701, and comprises a protruding edge 702, a bottom, and a heating wire disposed on the bottom, which is novel.

3. The e-liquid is directly injected into the atomizer via the top opening of the inner glass tube, which is easy to operate.

4. The air hole on the base of the atomizer is covered by the fixed ring disposed on the base. The air enters the atomizer from the space between the fixed ring and the base, and then flows to the air hole. The design is novel.

It will be obvious to those skilled in the art that changes and modifications may be made, and therefore, the aim in the appended claims is to cover all such changes and modifications.

What is claimed is:

1. A glass atomizer, wherein the glass atomizer comprises an outer glass tube and an inner glass tube disposed in the outer glass tube; the inner glass tube comprises a top end; an outer edge of the top end comprises a plurality of grooves; and the top end is integrated with an inner wall of the outer glass tube.

2. The glass atomizer of claim 1, wherein the glass atomizer further comprises a seal gasket and a ceramic heating core; the seal gasket comprises a hollow center and is disposed around the ceramic heating core; one end of the ceramic heating core is embedded in a bottom opening of the inner glass tube; a bottom end of the inner glass tube abuts against the seal gasket or the seal gasket is disposed around the bottom end of the inner glass tube.

3. The glass atomizer of claim 2, wherein the ceramic heating core is in the shape of a concave bowl, and comprises a protruding edge.

4. The glass atomizer of claim 3, wherein the glass atomizer further comprises a fixed ring and a base; the fixed ring is disposed around the base; and a bottom end of the outer glass tube is disposed around the fixed ring.

5. The glass atomizer of claim 4, wherein the base comprises an air hole.

6. The glass atomizer of claim 5, wherein the glass atomizer further comprises a silicone fixing part; the ceramic heating core is disposed on the silicone fixing part; and the silicone fixing part is disposed in the base.

7. The glass atomizer of claim 6, wherein the silicone fixing part comprises a recess.

8. The glass atomizer of claim 7, wherein the glass atomizer further comprises a seal plug disposed on a top of the inner glass tube and configured to seal a top opening of the inner glass tube after the inner glass tube is filled with e-liquid.

9. The glass atomizer of claim 8, wherein the glass atomizer further comprises a joint and an insulation ring; the insulation ring is disposed in a bottom of the base; and the joint is disposed in the insulation ring.

10. The glass atomizer of claim 9, wherein the glass atomizer further comprises a mouthpiece and a seal ring; the seal ring is disposed around the mouthpiece to seal a gap between the mouthpiece and the outer glass tube thus preventing the leakage of air and vapor; and the mouthpiece is disposed on a top of the outer glass tube.

11. The glass atomizer of claim 10, wherein when in use, the air enters the atomizer via a space between the fixed ring and the base, flows through the air hole on the base and the recess on the silicone fixing part, drives the vapor produced by the ceramic heating core to pass through the space between the inner glass tube and the outer glass tube, and is discharged from the plurality of grooves of the top end of the inner glass tube for user's inhaling via the mouthpiece.

12. The glass atomizer of claim 11, wherein the outer glass tube and the inner glass tube comprise toughened glass, high temperature resistant poly-cyclohexylenedimethylene terephthalate glycol (PCTG), high temperature resistant resin, high temperature resistant acrylic, an explosion-proof film, or a combination thereof.

* * * * *